United States Patent
Imada et al.

[15] 3,645,846
[45] Feb. 29, 1972

[54] PROCESS AND APPARATUS FOR ADDING A LIQUEFIED HYDROCARBON GAS TO A CULTURE MEDIUM

[72] Inventors: Osamu Imada, Machida-shi; Kazuo Hoshia, Tokyo, both of Japan; Masatami Tanaka, deceased, late of Machida-shi, Japan

[73] Assignee: Kyowa Hakko Kogyo Co., Ltd., Chiyoda-ku, Tokyo, Japan

[22] Filed: June 24, 1968

[21] Appl. No.: 740,448

Related U.S. Application Data

[63] Continuation of Ser. No. 696,957, Jan. 10, 1968, abandoned.

[30] Foreign Application Priority Data

Jan. 13, 1967 Japan...................................42/2181

[52] U.S. Cl. ..............................195/28 R, 195/95, 195/109, 195/115, 195/137, 195/142, 195/144
[51] Int. Cl. ...........................................C12d 13/06, C12b 1/00
[58] Field of Search ..................195/3, 3 H, 28, 96, 132, 133, 195/134, 135, 136, 137, 138, 139, 142, 144, 146, 95, 115

[56] References Cited

UNITED STATES PATENTS

| | | | |
|---|---|---|---|
| 3,268,419 | 8/1966 | Champagnet et al. | 195/28 |
| 3,340,155 | 9/1967 | Dourus et al. | 195/28 |

*Primary Examiner*—A. Louis Monacell
*Assistant Examiner*—Seymour Rand
*Attorney*—Craig, Antonelli and Hill

[57] ABSTRACT

A continuous process and apparatus for culturing a micro-organism in an aqueous nutrient medium under aerobic conditions in the presence of a liquefied hydrocarbon gas which comprises adding fresh liquefied hydrocarbon gas to the culture medium, measuring the concentration of the unused liquefied hydrocarbon gas removed from the culture medium, discharging the unused liquefied hydrocarbon gas to the atmosphere until a predetermined concentration of said liquefied hydrocarbon gas is reached, and then recycling the liquefied liquefield hydrocarbon gas while at the same time discontinuing the addition of the fresh liquefied hydrocarbon gas until the concentration of the unused liquefied hydrocarbon gas falls below said process concentration. The rpocess and apparatus of the present disclosure is also applicable to liquefied hydrocarbon gas-air mixtures.

14 Claims, 1 Drawing Figure

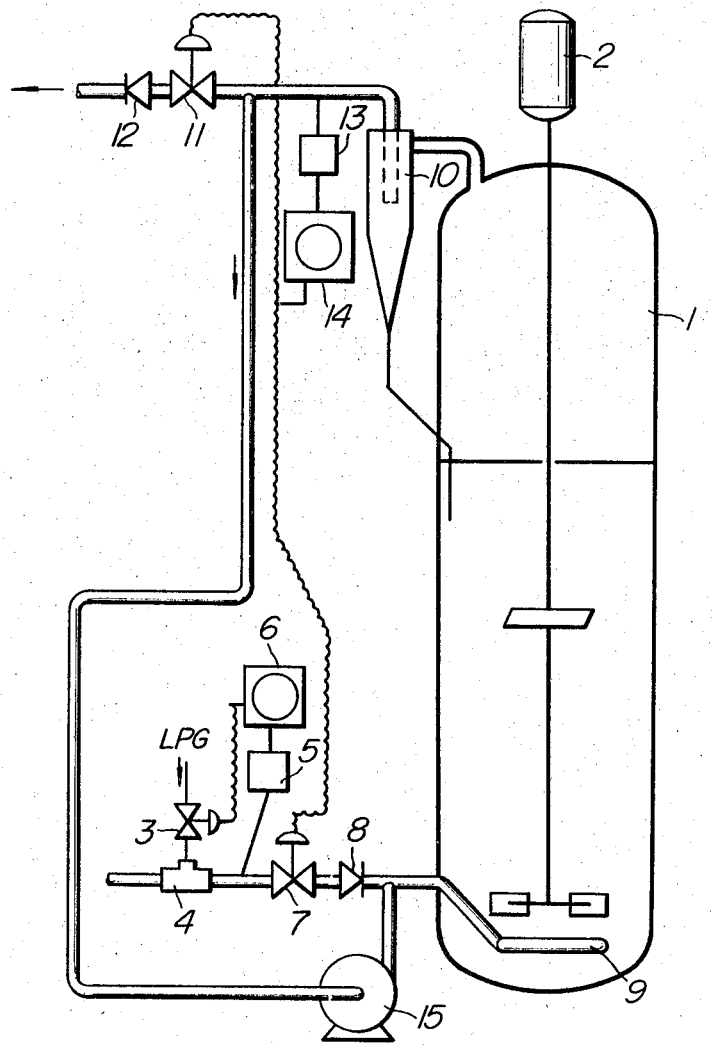

PROCESS AND APPARATUS FOR ADDING A LIQUEFIED HYDROCARBON GAS TO A CULTURE MEDIUM

CROSS-REFERENCE TO RELATED APPLICATION

This application is a continuation of copending application Ser. No. 696,957, filed on Jan. 10, 1968 which is now abandoned.

The present invention relates to a fermentation process and apparatus for culturing micro-organisms using a liquefied hydrocarbon gas which is hereinafter referred to as "LPG" (liquefied petroleum gas). More particularly, the present invention is concerned with a process and apparatus for culturing micro-organisms wherein LPG can be supplied to the culture medium without excess or shortage and the loss of LPG can be substantially prevented.

When it is desired to obtain a fermentation product by culturing micro-organisms under aerobic conditions, a method has been used which generally comprises inoculating micro-organisms in a culturing liquor to which a carbon source, nitrogen source, inorganic salts and other nutrient sources as well as the substances necessary for the formation of the desired product have been previously added. Suitable conditions of temperature, pH, and other conditions are provided for forming and accumulating the desired fermentation product in the culture liquor with or without stirring while air is blown into the liquor. For the fermentation apparatus, a fermentation tank has been used wherein the air is excessively blown into the culturing liquor and a vent gas containing the nonutilized oxygen and carbon dioxide gas generated during the fermentation is discharged from the tank. The ordinary fermentation raw material is nonvolatile in the state where the pH of the medium is nearly neutral, and since the culturing of micro-organisms is generally conducted under the conventional conditions of temperature and pressure, such as for example, a temperature of about 20° to 40° C. and atmospheric pressure, there is no fear of losing desired components of the culture medium even if the culturing is conducted under aerobic conditions with the blowing of air. Thus, it has never been necessary to consider the possibility of utilizing a recycling of the fermentation vent gas to prevent the loss of desired components.

LPG has a very low solubility in water, its solubility being almost proportional to the partial pressure of LPG in a gaseous phase. Accordingly, it is difficult to dissolve in the culturing liquor the necessary amount of LPG for culturing the micro-organisms in advance. Even if the solubility of LPG could be temporarily increased by compression, cooling or other means, the dissolved LPG is instantaneously vaporized and dissipated under the optimum conventional conditions for culturing the micro-organisms Furthermore, the partial pressure of the gas is lowered by blowing air into the liquor to produce aerobic conditions therein. As a result, most of the dissolved LPG is transferred into the gaseous phase and thus is only slightly utilized by the micro-organisms in the culture medium. Accordingly, in order to culture micro-organisms using LPG as a raw material, the LPG necessary for propagating the micro-organism at its own rate of propagation, and for forming and accumulating the desired fermentation product must be continuously supplied to the fermentation tank and must be dissolved in the culturing liquor. However, when LPG is supplied at a rate more than the rate of LPG consumption by the micro-organism, it exceeds the saturation solubility in the culturing liquor and the undissolved LPG is dissipated from the culturing system. On the other hand, when the rate of LPG supplied to the culture medium does not meet the rate of LPG consumption by the micro-organisms the propagation of the micro-organisms and formation of the fermentation products are impaired. Generally, the rate of substrate consumption by the micro-organisms depends upon the concentration and activity of cells of micro-organisms, and the concentration and activity of cells of micro-organisms change from time to time according to the progress of culturing. In practice, it is difficult to supply the raw material to the culturing system properly and maintain the proper substrate concentration without adding too much or not enough LPG to the culture medium in accordance with the rate of consumption by the micro-organisms. Particularly, LPG is difficult to dissolve in the culturing liquor and has a narrow range between its solubility and the concentration limit which controls the rate of consumption. Thus, it is difficult to obtain a correspondence between the amount of LPG dissolved and the amount of LPG consumed since this ratio changes from time to time. Accordingly, since the addition of LPG to the culture medium in excess, as in conventional aerobic fermentation procedures where air is excessively blown into the medium, results in a substantial loss of raw material which is not industrially desirable, and in view of the problems encountered due to a shortage of LPG in the culture medium, there is a need for effectively controlling and utilizing the LPG used in culturing micro-organisms.

An object of the present invention is to avoid the prior art disadvantages in the culturing of micro-organisms using a liquefied hydrocarbon gas.

Another object of the present invention is to provide an improved process and apparatus for culturing micro-organisms using a liquefied hydrocarbon gas wherein the amount of liquefied hydrocarbon gas is effectively controlled and utilized during the culturing of the micro-organism thereby enhancing the propagation of the cells of micro-organisms with a minimum loss in raw material.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that unused LPG or LPG-air mixtures discharged from the culturing medium during a fermentation process can be recovered by recycling and reblowing said unused mixture to the culture medium, depending upon the LPG concentration or oxygen concentration in said unused mixture. Thus the LPG is substantially utilized before the gases are discharged from the system. Thus, the present invention is concerned with a process and apparatus for culturing a micro-organism in an aqueous nutrient medium under aerobic conditions in the presence of a liquefied hydrocarbon gas as a carbon source which comprises adding fresh liquefied hydrocarbon gas or a liquefied hydrocarbon gas-air mixture to the culture medium, measuring the concentration of the unused liquefied hydrocarbon gas or air removed from the culture medium, discharging the unused liquefied hydrocarbon gas or gas-air mixture to the atmosphere until a predetermined concentration of said liquefied hydrocarbon gas is reached, and then recycling the unused liquefied hydrocarbon gas or gas-air mixture while at the same time discontinuing the addition of the fresh liquefied hydrocarbon gas or gas-air mixture until the concentration of unused liquefied hydrocarbon gas falls below said predetermined concentration.

According to the present invention, the consumption of LPG by the micro-organisms is accompanied by a consumption of oxygen such that the ratios of their consumption are substantially constant with respect to the particular kind of fermentation. Accordingly, if there is no change in the culturing conditions, for example aeration and stirring conditions, the coefficient of rate of LPG dissolution is substantially equal to the coefficient of the rate of gas dissolution. Accordingly, the rate of gas dissolution is proportional to the partial pressure of the respective gas. Thus, if the ratio of the partial pressures of LPG and oxygen in the culturing system is made constant, the ratio of the rates of dissolution becomes constant, and LPG and oxygen which the micro-organisms consume at a constant ratio can be readily dissolved and utilized at that constant ratio. That is to say, air and LPG are supplied at a constant ratio to the culture medium and partially utilized by the micro-organisms. That portion of the gas-air mixture which is not utilized is discharged from the system as a vent gas with the compositional ratio of the LPG to oxygen in the vent gas being equal to the ratio of the respective gases supplied to the culture medium. The partial pressures of LPG and oxygen are lowered only by the amounts consumed, but in conducting recyclic blowing and reutilization of the gas, oxygen never becomes reduced to the extent of affecting the effective consumption of LPG. Supply of LPG and air from the outside of the tank is discontinued during recycling, and when the LPG concentration is eventually reduced in the recycle gas and the solubility of the LPG in the culturing liquor becomes less than the limit of concentration which controls the rate of consumption by the micro-organisms, the vent gas is discharged out of the tank, and LPG and air are freshly supplied from the outside of the tank and undergo the repeated cycling. In this manner, LPG can be supplied without excess or shortage to the culture medium, and the loss of LPG can be substantially prevented.

Either a synthetic culture medium or a natural nutrient medium is suitable in the present invention as long as it contains the essential nutrients for growth of the micro-organism employed. Such nutrients are well known in the art and include substances such as a carbon source, a nitrogen source, inorganic compounds and the like which are utilized by the micro-organism employed in appropriate amounts. A liquefied hydrocarbon gas such as methane, ethane, propane, n-butane, iso-butane, propylene, butylene, and the like, is used as the carbon source. Small amounts of other carbon sources may also be present, such as for example, carbohydrates such as glucose, fructose, maltose, sucrose, starch, starch hydrolysates, molasses, etc., or any other suitable carbon source such as glycerol, mannitol, sorbitol, organic acids, glutamic acid, etc. These substances may be used either alone or in mixtures of two or more but in small amounts when compared to the primary source of carbon, that is the liquefied hydrocarbon gases mentioned above. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as corn-steep liquor, yeast extract, meat extract, peptone, fishmeal, bouillon, N-Z-Amine (trademark for a series of casein hydrolysates), casamino acid, fish solubles, rice bran extract, ribonucleic acid, etc., may be employed. Again these substances may be used either singly or in combinations of two or more. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc.

As stated above, the fermentation of the present invention may also be conducted with the use of a purely synthesized culture medium. In this case, the addition of an adequate amount of histidine in addition to the carbon source, an energy source, an inorganic nitrogen source, an inorganic substance and also, the addition of a small amount of an amino acid source, such as a mixture of amino acids in solution, casamino acid, etc., is desirable.

As is conventional in the art, growth-promoting agents such as biotin or amino acids such as glutamic acid or aspartic acid may be added to the medium.

The fermentation employed herein is conducted under aerobic conditions, such as aerobic shaking of the culture or with stirring of a submerged culture, at a temperature of about 20° to 40° C. and at a pH of about 5 to 9.

The present invention will become more fully understood from the detailed description given hereinbelow and the accompanying drawing which are given by way of illustration only and thus are not limitative of the present invention and wherein;

The drawing shows an apparatus for culturing a micro-organism according to the present invention.

Referring now to the drawing, the apparatus of the present invention comprises a fermentation liquor 1 which is stirred by a motor 2. LPG is mixed with air through a flow rate control valve 3 and by a mixer 4, and blown into the culturing liquor from an aeration pipe 9 through an automatic on-off valve 7 and a check valve 8. The vent gas which comprises the nonutilized gas leaves the top of the tank and enters a mist separator 10 where the mist is separated and discharged into the atmosphere through an automatic on-off valve 11 and a check valve 12. The LPG concentration in the air blown to the bottom of the tank is controlled by actuating the flow rate control valve 3 by means of a LPG concentration detector 5 and a LPG concentration controller 6. The LPG concentration in the vent gas is detected by a LPG concentration detector 13 and when the LPG concentration exceeds a predetermined value, an automatic on-off valve controller 14 transmits an "off" signal to the automatic on-off valves 7 and 11, whereby the air supply system is closed. On the other hand, the vent gas can be recycled to the aeration pipe 9 by a blower 15 and reblown into the tank. Accordingly, as the vent gas is recycled, the LPG concentration is lowered and said concentration is detected by the LPG concentration detector 13. When the LPG concentration becomes less than the predetermined value, the automatic on-off valve controller 14 transmits an "on" signal to the automatic on-off valves 7 and 11, thus opening the air supply system, whereby a mixture of LPG and air is blown into the tank and the vent gas is discharged from the system. The foregoing operation is automatically repeated during the culturing period by the apparatus of the present invention, and thus the fermentation proceeds smoothly.

The following examples are given merely as illustrative of the present invention and are not to be considered as limiting. Unless otherwise noted, the percentages in the application and in the examples are by weight.

EXAMPLE 1

In a fermentation tank which is 2 m. in diameter and 6 m. high, and has a construction as shown in the FIGURE is placed 10 m.$^3$ of an aqueous fermentation medium containing 0.05% of $KH_2PO_4$, 0.05% of $MgSO_4 \cdot 7H_2O$, 0.01% of $MnSO_4 \cdot 4H_2O$, 0.01% of $FeSO_4 \cdot 7H_2O$, 0.30% of $(NH_4)_2SO_4$, yeast 0.5% of extract and 10 mg./l. of thiamine. The solution is heated to 110° C. for 5 minutes to achieve sterilization and then cooled to 30° C. 300 l. of a precultured liquor of *Candida rigida* No. 113 (butane-assimilating micro-organism) (said micro-organism was disclosed in Bull. Agr. Chem. Soc. Japan, 40 (No. 3), 119–126 (1966), and the stock culture is kept in the University of Ibaragi, Japan) is inoculated into the sterilized fermentation solution. The process is commenced by stirring at a rate of 250 revolutions per minute and at a temperature of 30° C. The culturing solution is maintained at a pH of 6.0 during said culturing by adding $NH_3$ gas thereto and by means of a pH controller. Culturing is conducted by supplying n-butane to the fermentation medium at a butane-gas concentration in the gas mixture of about 1.8 percent and by automatically actuating the valve capable of making the vent valve and the gas supply valve "off" or "on" so that the butane gas concentration in the vent gas can be controlled to about 0.05 percent or less. The flow rate of the recycling blower is adjusted to 30 Mn$^3$/min., and the pressure difference between the inlet and the outlet of the blower is made to have a $\Delta P=0.4$–$0.5$ kg./cm.$^2$.

After about 40 hours of culturing, the propagation of the cells of micro-organisms reaches a maximum, and a culture liquor containing 27 g./l. of cells of micro-organisms is obtained. The culture liquor is then subjected to a centrifugal separation, and after drying the cells of micro-organisms 280 kg. of said dry cells are obtained. In this culture, the total amount of butane supplied is 1,080 kg., and the assimilation efficiency is 27.8 percent.

On the other hand, when culturing is conducted under the same conditions except that recycle is not utilized and the butane gas concentration in the aeration is adjusted to about 0.8–1.8 percent, the propagation of the cells of micro-organisms did not reach 10 g./l. even after 40 hours of culturing. The total butane supplied is 2,450 kg. and the assimilation efficiency is about 4 percent. In the latter case, the amount of butane dissipated into the vent gas is 2,040 kg. Thus about 83 percent of the total butane supplied is discharged out of the culturing system and not utilized.

EXAMPLE 2

Example 2 is similar to example 1 except that in example 2, *Candida japonica* No. 104 ATCC 14437 (propane-assimilating micro-organism) is used, and n-propane gas is used in place of butane gas in the gaseous mixture supplied to the fermentation medium. By adjusting the propane concentration in the gaseous mixture to about 2.1 percent, and the propane gas concentration in the vent gas to about 0.08 percent or less, the recycle aeration culturing process is conducted. The propagation of the cells of micro-organisms reaches a maximum after about 40 hours of culturing, and a culture solution containing 34 g./l. of cells of micro-organisms is recovered. The propane gas supplied to that culturing is 1,210 kg. and the assimilation efficiency is 28.9 percent.

On the other hand, when the culturing is conducted at a propane gas concentration for aeration of about 0.8–1.0 percent under the same conditions except that the recycle of the vent gas is not utilized, the propagation of the cells of micro-organisms does not reach more than 12 g./l. after about 40 hours of culturing. The amount of propane supplied is 2,040 kg. and the assimilation efficiency is about 4.7 percent. In the latter case, the propane gas loss into the vent gas is about 2,000 kg., and reaches about 70 percent of the total supply.

EXAMPLE 3

An aqueous fermentation medium containing 2.0% of $NH_4NO_3$, 0.05% of $Na_2HPO_4 \cdot 12H_2O$, 0.05% of $KH_2PO_4$, 0.01% of $MgSO_4 \cdot 7H_2O$, 0.001% of $MnSO_4 \cdot 4H_2O$, 0.001% of $FeSO_4 \cdot 7H_2O$, 0.001% of $ZnSO_4 \cdot 7H_2O$, 0.001% of $CaCl_2 \cdot 2H_2O$, 50 $\gamma$/l. of $CuSO_4 \cdot 5H_2O$, 10 $\gamma$/l. of $H_3BO_3$, 10 $\gamma$/l. of $Na_2MoO_4 \cdot 2H_2O$) and 0.1 percent of CSL at a pH 7.0 is placed in a fermentation tank in the same manner as in example 1, and cooled to 30° C. after the heating sterilization.

Precultured liquors of various micro-organisms are inoculated into the sterilized fermentation medium, and cultured at 30° C. one by one, and the amounts of the propagation are determined and compared with one another. The result is shown in table 1. The amounts of the propagation depend upon the species of the micro-organisms and the employment of the circulation, but reach the stationary values after about 10 hours.

The invention being thus described, it will be obvious that the same may be varied in many ways. Such variations are not to be regarded as a departure from the spirit and scope of the invention, and all such modifications are intended to be included within the scope of the following claims.

It is claimed:

1. A continuous process for culturing a micro-organism in an aqueous nutrient medium under aerobic conditions in the presence of a liquefied hydrocarbon gas as the main carbon source which comprises adding fresh liquefied hydrocarbon gas to the culture medium, measuring the concentration of the unused liquefied hydrocarbon gas removed from the culture medium, discharging the unused liquefied hydrocarbon gas to the atmosphere until a predetermined concentration of said liquefied hydrocarbon gas is reached, and then recycling the unused liquefied hydrocarbon gas while at the same time discontinuing the addition of the fresh liquefied hydrocarbon gas until the concentration of unused liquefied hydrocarbon gas falls below said predetermined concentration.

2. The process of claim 1, wherein the micro-organism belongs to a genus selected from the group consisting of Candida, Brevibacterium, Arthrobacter and Micrococcus.

3. The process of claim 1 wherein the micro-organism is a member selected from the group consisting of *Candida rigida* No. 113, *Candida japonica*, No. 104, ATCC 14437, *Brevibacterium ketoglutamicum* ATCC 15587, *Brevibacterium ketoglutamicum* ATCC 15588, *Arthrobacter roseoparaffinus* ATCC 15584 and *Micrococcus paraffinolyticus* ATCC 15582.

4. The process of claim 1 wherein the liquefied hydrocarbon gas is selected from the group consisting of methane, ethane, propane, n-butane, iso-butane, propylene and butylene.

5. The process of claim 1 wherein the liquefied hydrocarbon gas is mixed with air or a mixture of oxygen and air.

6. The process of claim 5 wherein the ratio of consumption of the oxygen to the liquefied hydrocarbon gas is substantially constant.

7. The process of claim 5 wherein the concentration of the liquefied hydrocarbon gas in the gas-air mixture is established and controlled before it is introduced into the culture medium.

8. A continuous process for culturing a micro-organism selected from the group consisting of *Candida rigida* No. 113, *Candida japonica* No. 104 ATCC 14437, *Brevibacterium ketoglutamicum* ATCC 15587, ATCC 15588 *Brevibacterium ketoglutamicum*, *Arthrobacter roseoparaffinus* ATCC 15584 and *Micrococcus paraffinolyticus* ATCC 15582, in an aqueous nutrient medium under aerobic conditions in the presence of a liquefied hydrocarbon gas as the main carbon source which comprises adding a mixture of fresh liquefied hydrocarbon gas

TABLE 1

| Strain | Amount of cells of micro-organisms (mg./ml.) | | Percent assimilation (percent) | | Total amount of butane fed (kg.) | | Overall yield (percent) circulated/non-circulated |
| --- | --- | --- | --- | --- | --- | --- | --- |
| | Circulated | Noncirculated | Circulated | Noncirculated | Circulated | Noncirculated | |
| *Brevibacterium ketoglutamicum* ATCC 15587 | 12.6 | 6.3 | 50.5 | 50.0 | 277 | 1,110 | 45.4/5.7 |
| *Brevibacterium ketoglutamicum* ATCC 15588 | 8.4 | 3.1 | 43.0 | 40.0 | 215 | 1,110 | 39.0/2.78 |
| *Arthrobacter roseoparaffinus* ATCC 15584 | 14.4 | 6.2 | 25.3 | 26.1 | 616 | 1,110 | 23.4/5.59 |
| *Micrococcus paraffinolyticus* ATCC 15582 | 10.0 | 5.1 | 60.1 | 63.0 | 183 | 1,110 | 54.6/4.59 |

NOTE.—Overall yield: (Amount of cells of microorganisms/amount of hydrocarbon supplied)×100(percent). Percent assimilation: (Amount of strain used/Butane consumed)×100(percent).

The process and apparatus of the present invention are applicable to micro-organisms such as yeasts, bacteria, molds, actinomycetes and fungi. The present invention is particularly applicable to yeasts such as *Candida rigida* No. 113, and *Candida japonica* No. 104, ATCC No. 14437 and similar-type micro-organisms.

and air to the culture medium, conducting the culturing at a temperature of about 20° to 40° C. and a pH of about 5 to 9, measuring the concentration of the unused liquefied hydrocarbon gas in the gas-air mixture removed from the culture medium, discharging the unused liquefied hydrocarbon gas-air mixture to the atmosphere until a predetermined concentration of said liquefied hydrocarbon gas is reached, then recycling the unused liquefied hydrocarbon gas-air mixture while at the same time discontinuing the addition of the fresh liquefied hydrocarbon gas-air mixture to the culture medium until the concentration of unused liquefied hydrocarbon gas falls below said predetermined concentration.

9. The process of claim 8 wherein the concentration of the oxygen in the unused liquefied hydrocarbon gas-air mixture discharged from the culture medium is used to control the recycling of the unused gas-air mixture and the addition of the fresh gas-air mixture.

10. The process of claim 8, wherein the liquefied hydrocarbon gas is selected from the group consisting of methane, ethane, propane, n-butane, iso-butane, propylene and butylene.

11. An apparatus for culturing micro-organisms which comprises a container means provided with a fermentation liquor, inlet means for introducing a liquefied hydrocarbon gas into said container means, means for venting the unused liquefied hydrocarbon gas from the container means to the atmosphere, means for recycling said unused liquefied hydrocarbon gas to the fermentation liquor in the container means and concentration detector means associated with the vent means, said detector means measuring the concentration of the liquefied hydrocarbon gas in the vent means and thereby selectively controlling the discharge and recycle of the unused liquefied hydrocarbon gas in the apparatus and the introduction of fresh liquefied hydrocarbon gas to the apparatus and to supply liquefied hydrocarbon gas only during the nonrecycling stages.

12. The apparatus of claim 11 wherein means are provided for introducing a controlled mixture of the liquefied hydrocarbon gas and air to the container means.

13. The apparatus of claim 11 wherein the vent means and inlet means are provided with valve means which are controlled by the concentration detector means.

14. The apparatus of claim 11 wherein blower means are associated with the recycle means.

* * * * *